United States Patent Office 3,849,520
Patented Nov. 19, 1974

3,849,520
RESINOUS BLEND AND ORIENTED SHRINK FILM COMPRISING POLYPROPYLENE, POLYBUTENE AND ETHYLENE/BUTENE COPOLYMER
Edward M. Bullard, South Orange, and Malcolm P. Schard, Washington Township, N.J., assignors to Mobil Oil Corporation
No Drawing. Filed Jan. 17, 1973, Ser. No. 324,265
Int. Cl. C08f 29/12
U.S. Cl. 260—897 A
7 Claims

ABSTRACT OF THE DISCLOSURE

Resinous thermoplastic blend compositions and oriented shrink films formed therefrom comprising a blend of from about 50% up to about 95% by weight of a high isotactic polypropylene resin and from about 5% to about 50% by weight of a resinous mixture comprising from about 10% up to about 75% by weight of polybutene homopolymer and from about 90% to about 25% by weight of a high isotactic content ethylene/butene-1 copolymer resin containing from about 0.1% to less than 10% by weight ethylene.

BACKGROUND OF THE INVENTION

(I) Field of the invention

Thermoplastic films are finding increasing usage as packaging materials and particularly in the area of shrink packaging wherein objects are packaged in thermoplastic shrink film and upon the application of heat the film shrinks to conform to the shape of the article packaged therein.

The present invention relates to blends of thermoplastic materials and oriented shrink films produced therefrom having improved properties. More particularly, the present invention relates to blends of polypropylene resin with a resinous mixture of polybutene-1 and an ethylene-butene copolymer having minor amounts of ethylene: such resinous blends have been found especially useful in the fabrication of shrink films having excellent heat seal properties.

(II) Description of the prior art

In the past a wide variety of resinous thermoplastic materials have been employed in the manufacture of heat shrinkable films including oriented polyethylene which has been irradiated and oriented polypropylene for example. Additionally, U.S. Pat. Nos. 3,634,552 and 3,634,553 disclose the employment of resinous blend mixtures suitable for the production of heat-shrink films. Such mixtures include polypropylene blended with varying amounts of an ethylene-butene-1 copolymer resin containing minor amounts of ethylene.

SUMMARY OF THE INVENTION

Applicants have now found that certain properties including heat seal strength, of shrink films fabricated from resinous blends of polypropylene and ethylene-butene-1 copolymers are improved by adding to the resinous blend mixture varying amounts of a polybutene-1 homopolymer resin. Especially desirable results are obtained from resinous blend mixtures comprising from about 50% up to about 95% by weight of a high isotactic polypropylene and about 5% to about 50% by weight of a resinous mixture comprising from about 90% to about 25% of a high isotactic content ethylene-butene-1 copolymer and from about 10% up to about 75% by weight of polybutene-1 homopolymer. The ethylene butene-1 copolymer employed may contain from about 0.1% to less than 10% by weight of ethylene.

DESCRIPTION OF SPECIFIC EMBODIMENTS

The polypropylene resin component of the shrink film compositions in accord with the present invention is highly isotactic polypropylene and, for example, a propylene having a solubility isotactic index of at least 90 as measured in heptane. Such polypropylene is produced, as is well known in the art, by polymerizing propylene in the presence of stereospecific catalyst systems. Such polypropylene homopolymers include those which are formed in the presence of minor amounts of ethylene monomers (i.e., on the order of less than 5% by weight) added to facilitate film-forming techniques and film properties formed from such resins.

The ethylene-butene-1 copolymer resins which may be used in the fabrication of shrink film compositions of this invention are copolymers of ethylene and butene-1 containing from about 0.1 to less than 10 weight percent ethylene. Based on analysis of crystalline morphology, the copolymer is one containing lengthy sequences of butene-1 units in isotactic configuration followed by random but shorter methylene sequences. Such copolymers may be produced by copolymerizing butene-1 and ethylene in the presence of stereo-specific polymerization catalysts. For example, such copolymers may be made by reacting an appropriate mixture of butene-1 and ethylene in the presence of suitable catalysts, such as titanium trichloride with an aluminum compound, typical of which are alkyl aluminum halides such as diethylaluminum chloride. A particularly suitable process for preparing them is described in U.S. Pat. No. 3,629,940 which discloses, for example, liquid phase copolymerization of mixtures of butene-1 and ethylene to produce ethylene-butene copolymers utilizing a catalyst system comprising (A) a compound of a transitional metal of Groups IV–A, V–A, VI–A and VII of the Periodic Arrangement of the Elements wherein the metal is present in a valance state lower than its maximum, and (B) at least one organo-metallic compound of the metals of Groups II and III of the Periodic Arrangement of the Elements. A particularly suitable catalyst comprises diethylaluminum chloride, diethylaluminum iodide and TiCl$_3$, as set forth in U.S. Pat. No. 3,629,940, for liquid phase polymerization of a mixture of ethylene and butene to form a relatively high isotactic copolymer. Such a method was used in preparation of the ethylene-butene-1 copolymers used in applicants' following specific embodiments of the present invention. More particularly the present invention is carried out with the use of an ethylene-butene-1 copolymer having a melt index of from about 0.1 to about 5.0 and a methylene absorption value of from about 0.0001 to about 0.04, i.e., absorbence units/mil at a wave number of 720, a DTA thermal peak value of at least 80° C. to 130° C. As used herein, DTA designates differential thermal analysis carried out by heating at a rate of rise of 5° C./minute.

Particularly preferred ethylene butene-1 resins are those having a tensile modulus of at least 5,000 p.s.i. (ASTM test D–638), preferably not more thane 20,000 p.s.i., and still more preferably in the range of 9,000 to 15,000 p.s.i.

Polybutene-1 resin which may be employed in the resinous blend compositions of the present invention, in general has an isotactic index (weight percent insoluble in diethyl ether) of about 80 or higher and, usually, about 90 or more. A procedure which may be employed to produce tactic polybutene-1 suitable for employment in the present invention is fully described in U.S. Pat. No. 3,362,940. Polybutene resins which are particularly suitable for employment in the resinous blend compositions of the present invention are those exhibiting the following ranges of physical properties:

| | |
|---|---|
| Melt index | 1.5–1.9 |
| Density (g./cc.) | 0.905–0.912 |
| Tensile yield strength (p.s.i.) | 1500–2200 |
| Tensile break strength (p.s.i.) | 3800 (minimum) |
| Elongation (percent) | 300 (minimum) |

A number of prior art orientation techniques may be employed to stretch and form the shrink film structures of the present invention. In general, oriented films may be obtained by stretching processes in which tensions capable of stretching the film are applied to the film, the directions of which form an angle of about 90°. These film stretching tensions to orient the film may be applied sequentially to produce a biaxially oriented film as when a film is stretched initially in one direction and thereafter stretched in a direction 90° divergent from the first stretching direction. Also the film may be biaxially stretched and oriented simultaneously whereby longitudinal and transverse tensions are applied to the film and transverse stretching of the film. Such latter processes are well known in the art and include, for example, the "double-bubble" method which comprises extrusion of a tubular base film, cooling of the tubular film, reheating and inflation of the tube and simultaneously drawing the inflated tube in a longitudinal direction thereby imparting biaxial orientation to the film. A common method and apparatus for the sequential biaxial orientation of film comprises passing the film sheet through a series of rotating draw rollers which impart longitudinal direction stretch and subsequently transversely drawing the longitudinally stretched film, for example, by passing it through a heated tenter frame wherein the film is stretched in a transverse direction.

Prior to extrusion into a film structure, the homopolymer and copolymer components comprising the blend composition of the present invention are blended together to form a substantially homogeneous resin mixture. This may be accomplished, for example, by masticating the components on a slightly warm, differential speed, 2-roll mill or in similar polymer blending machinery, such as a Banbury mill. The blend is then extruded into a film utilizing a standard extruder and tubular or flat film die and is subsequently oriented utilizing any one of a number of prior art film orientation techniques as hereinbefore described.

Various gauges of shrink film may be manufactured utilizing the novel resin compositions of the present invention and the gauge may generally vary from about 0.10 mil up to about 10 mils and preferably from about 0.5 mil to about 2.0 mils depending to a great extent on the type of shrink film packaging applications for which the film is manufactured.

In accord with the present invention oriented shrink films are fabricated from a resinous blend of from about 50% up to about 95% by weight of polypropylene and preferably from about 70% up to about 90% by weight; and from about 5% to about 50% by weight and preferably from about 10% to about 30% by weight of a resinous mixture comprising:

(a) from about 10% to about 75% by weight of polybutene-1 homopolymer, and
(b) from about 90% to about 25% by weight of an ethylenebutene-1 copolymer, and preferably with the resinous mixture containing:

from about 20% to about 60% by weight of polybutene-1 homopolymer, and
from about 80% to about 40% by weight of an ethylene butene-1 copolymer.

It has been found that shrink film fabricated from such resinous blend mixtures exhibit excellent physical characteristics such as high optics, good resistance to blocking and most particularly an unexpected increase in heat seal values.

EXAMPLE I

A mixture of (a) 84.75% by weight of polypropylene marketed by Enjay as E–612, a high isotactic content resin and having a melt index at 230° C. of 0.7; (b) 8.5% by weight of an ethylene-butene-1 copolymer having a melt index at 190° C. of 1.8, a methylene absorption value of 0.013, an ethylene content of about 4.0% by weight, and a melting point of 95° C. (Differential Thermogram); and (c) 6.5% by weight polybutene having the following properties:

| | |
|---|---|
| Melt index | 1.8 |
| Tensile yield strength (p.s.i.) | 1587 |
| Tensile break strength (p.s.i.) | 3917 |
| Density (g./cc.) | 0.906 |
| Elongation (percent) | 411 |
| Melting point (differential thermal analysis): | 121° C. | was blended utilizing a Banbury mill and subsequently fed into the hopper of a standard, rotating screw, extrusion apparatus which served to further mix and melt the blend. The temperature of the melt within the extruder was maintained at about 490° F. The blend was subsequently extruded in the shape of a tube from a tubular die affixed to the outlet end of the extruder, the die being maintained at a temperature of about 450° F. The tube was quenched to a temperature of about 140° F., which was substantially below the crystalline melting points of the resinous components of the film, immediately upon emergence from the die. The extruded tube had an external diameter of about 4⅛ inch and a wall thickness of about 20 mils. Upon cooling, the tube was collapsed by a set of nip rollers and passed into a preheat oven wherein it was reheated. The temperature of the preheat oven was maintained at about 405° F. in the entry zone thereof and at approximately 1050° F. at the exit zone of the oven with the exiting tube having a surface temperature of about 275° F. The collapsed, heated tube was immediately reinflated with air under pressure which expanded the heated tube by a ratio of about 5.9:1 in a transverse direction and a substantially similar ratio in the longitudinal direction. The expanded tube was subsequently collapsed by a pair of draw rollers operating at higher than the rotational speed of said nip rollers. The biaxially oriented tube, which had a haze value below 2.0% (Gardner haze value) and a gloss value above 80 (Gardner gloss value), was finally passed to a set of wind-up rollers.

In the following Table 1, physical properties are given for the shrink film produced in accordance with Example 1. Also reported in Table 1 are the physical properties of two other shrink films formed in accordance with Example 1, from resinous blend compositions within the scope of the present invention. For comparative purposes, there are also given in Table 1 physical properties of oriented films, produced in accordance with Example 1, and formed from resinous blend mixtures which omit at least one of the resin components of the blend compositions of the present invention. All percentages given are in terms of percent by weight of resin based upon the total weight of the resinous blend.

In the following Table 1, the test procedures employed to determine physical property data of the films are as follows:

| Property: | ASTM test designation |
|---|---|
| Haze | D–1003 |
| Gloss | D–2457–65T |
| Coefficient of friction | D–1894 |
| Blocking force | D–1893 |

Heat sealing may be effected by any of the conventional means in the art, including hot wire, bar and dielectric. Depending upon various factors including thickness and type of sealer, dwell time is generally about 0.5–2 seconds and sealing temperature is 300 to 400° F. In the following Table 1 heat seals were formed utilizing a standard hot wire impulse sealer. An impulse of 125 volts was applied across a 0.0036 inch diameter nichrome wire for an impulse dwell time of 0.2 second and a sealing jaw dwell time of 0.9 second. The applied pressure during sealing was about 20 p.s.i. Heat seal strength data presented in the following Table was determined utilizing a standard tensile testing machine, in accordance with A.S.T.M. Designation D-882.

TABLE 1

|  | Run 1 | Run 2 | Run 3 | Run 4 | Run 5 |
|---|---|---|---|---|---|
| Percent Ethylene-butene copolymer, (4.0% ethylene by weight) | 8.5 | 15 |  | 11.5 | 6.5 |
| Percent Polybutene-1 | 6.5 |  | 15 | 3.5 | 8.5 |
| Percent Polypropylene | 84.75 | 84.75 | 84.75 | 84.75 | 84.75 |
| Percent Superfloss, (anti-block agent) | .1 | .1 | .1 | .1 | .1 |
| Percent Erucamide, (slip agent) | .15 | .15 | .15 | .15 | .15 |
| Shrink film properties |  |  |  |  |  |
| Percent shrink, (at 95° C.) | 20.2 | 22.4 | 20.2 | 19.0 | 21.3 |
| Haze, (A.S.T.M. D-1003), (aged 1 week at room temperature) | 1.8 | 1.4 | 1.4 | 1.5 | 1.6 |
| Gloss, (A.S.T.M. D-2457-65T), (aged 1 week at room temperature): |  |  |  |  |  |
| MD | 85.1 | 88.0 | 87.3 | 86.6 | 87.0 |
| TD | 84.9 | 87.6 | 86.7 | 86.1 | 86.3 |
| Coefficient of friction—static, (aged 1 week at room temperature) | .41 | .37 | .42 | .34 | .36 |
| Coefficient of friction—kinetic, (aged 1 week ar room temperature), A.S.T.M. D-1894-63 | .39 | .37 | .46 | .37 | .41 |
| Block force (g,s./cm.), A.S.T.M. D-1893, (aged 1 week at room temperature) | .24 | .98 | .16 | .46 | .24 |
| Haze, (aged 3 days at 125° F.) | 2.0 | 1.5 | 2.2 | 2.1 | 1.4 |
| Gloss, (aged 3 days at 125° F.): |  |  |  |  |  |
| MD | 76.7 | 83.1 | 79.8 | 79.4 | 80.9 |
| TD | 79.0 | 83.6 | 78.1 | 79.5 | 80.6 |
| Coefficient of friction, (aged 3 days at 125° F.) | .22 | .28 | .23 | .20 | .24 |
| Do | .22 | .26 | .24 | .20 | .23 |
| Block force, (aged 3 days at 125° F.) | 1.16 | 2.89 | .66 | 1.84 | 2.15 |
| Seal strenght: |  |  |  |  |  |
| MD | 8,470 | 4,540 | 7,830 | 8,890 | 7,820 |
| TD | 10,200 | 8,050 | 8,800 | 9,640 | 9,700 |
| Coefficient of friction, (aged 2 weeks) | .23 | .26 | .34 | .29 | .35 |
| Do | .21 | .28 | .38 | .34 | .35 |
| Block force, (aged 2 weeks) | .33 | .83 | .28 | .25 | .24 |
| Haze, (aged 2 weeks) | 1.7 | 1.5 | 1.5 | 1.5 | 1.8 |
| Gloss, (aged 2 weeks): |  |  |  |  |  |
| MD | 86.8 | 88.2 | 87.4 | 85.7 | 86.3 |
| TD | 86.0 | 38.0 | 87.0 | 85.0 | 85.6 |

It can be seen from the data presented in foregoing Table 1 that the resinous blend compositions of the present invention form shrink film structures with excellent film properties including optics and blocking resistance and in particular exhibit exceptionally high heat seal strengths as contrasted with films fabricated from resinous blends which omit a component resin (cf. runs 2 and 3 of Table 1) of the present invention. Moreover, it will be noted that the heat seal strengths obtained when employing polypropylene blended with a mixture of polybutene and ethylene-butene copolymer would not be expected considering the seal strengths obtained with a blend of polypropylene and ethylene butene copolymer alone as well as blends of polypropylene with polybutene alone. It should be noted in regard to seal strengths, that synergistic effects are obtainable by a correlation of the amount of polybutene admixed with the ethylene-butene-1 copolymer (prior to blending with polypropylene) and particularly in which polybutene is present in an amount within the range of from about 20% to about 60% by weight based on the total weight of the polybutene and ethylene-butene copolymer present in the blend.

Additives to impart desired film surface properties may be incorporated into the polymer blend compositions of the present invention, for example, additives which reduce or eliminate the films' tendency to fog with condensed moisture from emitting commodities such as fresh meats and produce. Also, antistatic additives which reduce the tendency of the film to build up static electricity charges and many others such as anti-cling additives; additives which promote film slip; and additives which reduce the tendency of multiple layers of film to block together may be added to the blend compositions.

Although the present invention has been described with preferred embodiments, it is to be understood that modifications and variations may be resorted to, without departing from the spirit and scope of this invention, as those skilled in the art will readily understand.

What is claimed is:

1. A resinous blend composition comprising:
   (A) from about 50% up to about 95% by weight of a high isotactic content polypropylene resin; and
   (B) from about 5% to about 50% by weight of a resinous mixture comprising:
      (a) from about 10% up to about 75% by weight of a high isotactic content polybutene; and
      (b) from about 25% up to about 90% by weight of a high isotactic content ethylene/butene-1 copolymer resin containing from about 0.1% to less than 10% by weight ethylene.

2. The composition of claim 1 wherein said blend consists essentially of:
   (A) from 70% to about 90% by weight of a high isotactic content polypropylene resin; and
   (B) from about 10% to about 30% by weight of a resinous mixture comprising:
      (a) from about 20% up to about 60% by weight of a high isotactic content polybutene; and
      (b) from about 80% up to about 40% by weight of a high isotactic content ethylene-butene-1 copolymer resin containing from about .1 to less than 10% by weight ethylene.

3. The composition of claim 1 wherein said blend consists essentially of:
   (A) about 85% by weight of a high isotactic content polypropylene; and
   (B) about 15% by weight of a resinous mixture comprising a high isotactic content ethylene-butene-1 copolymer containing from about 0.1% to less than 10% by weight ethylene and a high isotactic content polybutene.

4. A heat shrinkable oriented thermoplastic film comprising:
   (A) from about 50% up to about 95% by weight of a high isotactic content polypropylene resin; and (B) from about 5% to about 50% by weight of a resinous mixture comprising:
 (a) from about 10% up to about 75% by weight of a high isotactic content polybutene; and
 (b) from about 25% up to about 90% by weight of a high isotactic content ethylene-butene-1 copolymer resin containing from about 0.1% to less than 10% by weight ethylene.

5. A film as defined in claim 1 that is biaxially oriented.

6. A film as defined in claim 1 which comprises a biaxially oriented film tube.

7. A heat shrinkable oriented thermoplastic film comprising:
 (A) from 70% to about 90% by weight of a high isotactic content polypropylene resin; and
 (B) from about 10% to about 30% by weight of a resinous mixture comprising:
  (a) from about 20% up to about 60% by weight of a high isotactic content polybutene; and
  (b) from about 80% up to about 40% by weight of a high isotactic content ethylene-butene-1 copolymer resin containing from about 0.1% to less than 10% by weight ethylene.

References Cited

UNITED STATES PATENTS

| 3,634,552 | 1/1972 | Foglia et al. | 260—897 A |
| 3,634,553 | 1/1972 | Foglia et al. | 260—897 A |

FOREIGN PATENTS

| 775,184 | 1/1968 | Canada | 260—897 |

MURRAY TILLMAN, Primary Examiner

C. J. SECCURO, Assistant Examiner

U.S. Cl. X.R.

264—210, 289, 290